United States Patent
Ma et al.

(10) Patent No.: US 12,093,099 B2
(45) Date of Patent: Sep. 17, 2024

(54) METHOD AND APPARATUS FOR CONTROLLING VOLTAGE OF POWER SUPPLY OF DATA PROCESSING DEVICE, DATA PROCESSING DEVICE, AND STORAGE MEDIUM

(71) Applicant: SHENZHEN MICROBT ELECTRONICS TECHNOLOGY CO., LTD., Guangdong (CN)

(72) Inventors: Weibin Ma, Guangdong (CN); Lihong Huang, Guangdong (CN); Yuefeng Wu, Guangdong (CN); Haifeng Guo, Guangdong (CN); Zuoxing Yang, Guangdong (CN)

(73) Assignee: SHENZHEN MICROBT ELECTRONICS TECHNOLOGY CO., LTD., Guangdong (CN)

( * ) Notice: Subject to any disclaimer, the term of this patent is extended or adjusted under 35 U.S.C. 154(b) by 79 days.

(21) Appl. No.: 17/997,316

(22) PCT Filed: May 19, 2021

(86) PCT No.: PCT/CN2021/094527
§ 371 (c)(1),
(2) Date: Oct. 27, 2022

(87) PCT Pub. No.: WO2022/037145
PCT Pub. Date: Feb. 24, 2022

(65) Prior Publication Data
US 2023/0176639 A1    Jun. 8, 2023

(30) Foreign Application Priority Data

Aug. 18, 2020   (CN) .......................... 202010830757.9

(51) Int. Cl.
G06F 1/26 (2006.01)

(52) U.S. Cl.
CPC .................................. G06F 1/266 (2013.01)

(58) Field of Classification Search
CPC ........ G06F 1/266; G06F 1/3296; G06F 1/206; Y02D 10/00
See application file for complete search history.

(56) References Cited

U.S. PATENT DOCUMENTS

| 2006/0031691 A1* | 2/2006 | Bacchus | G06F 1/3228 713/300 |
| 2006/0129852 A1* | 6/2006 | Bonola | G06F 1/3203 713/300 |

(Continued)

FOREIGN PATENT DOCUMENTS

| CN | 107145208 A | 9/2017 |
| CN | 108519806 A | 9/2018 |

(Continued)

OTHER PUBLICATIONS

International Search Report and Written Opinion mailed Aug. 17, 2021 in International Patent Application No. PCT/CN2021/094527.

*Primary Examiner* — Jaweed A Abbaszadeh
*Assistant Examiner* — Brian J Corcoran
(74) *Attorney, Agent, or Firm* — Venable LLP

(57) ABSTRACT

Implementations of this application provide a method and an apparatus for controlling a voltage of a power supply of a data processing device and a data processing device. The method includes: determining a computing power ratio of the data processing device based on an actual computing power and a theoretical computing power of the data processing device; generating a power supply control instruction based on a result of comparison between the computing power ratio and a predetermined threshold; and controlling an output voltage of the power supply of the data processing device based on the power supply control instruction. According to the implementations of this application, the (Continued)

output voltage of the power supply is controlled according to the computing power ratio, and a good compromise can be obtained between the power consumption loss and the computing power of the data processing device.

7 Claims, 6 Drawing Sheets

(56) References Cited

U.S. PATENT DOCUMENTS

| | | | |
|---|---|---|---|
| 2011/0225591 A1* | 9/2011 | Wada | G06F 9/4881 718/103 |
| 2014/0201558 A1 | 7/2014 | Darrington et al. | |
| 2021/0203328 A1* | 7/2021 | Zhang | H03L 7/085 |
| 2023/0043419 A1* | 2/2023 | Zhang | G06F 1/3243 |

FOREIGN PATENT DOCUMENTS

| | | |
|---|---|---|
| CN | 108693934 A | 10/2018 |
| CN | 108733540 A | 11/2018 |
| CN | 108984360 A | 12/2018 |
| CN | 109086130 A | 12/2018 |
| CN | 109144230 A | 1/2019 |
| CN | 109240880 A | 1/2019 |
| CN | 10333766 A | 10/2019 |
| CN | 110333766 A | 10/2019 |
| CN | 110413399 A | 11/2019 |
| CN | 110675143 A | 1/2020 |
| CN | 110687952 A | 1/2020 |
| CN | 110825208 A | 2/2020 |
| CN | 111506154 A | 8/2020 |
| CN | 111538382 A | 8/2020 |
| CN | 111966202 A | 11/2020 |
| KR | 20190142465 A | 12/2019 |
| WO | 2019233206 A1 | 12/2019 |
| WO | 2020091690 A1 | 5/2020 |

* cited by examiner

METHOD AND APPARATUS FOR CONTROLLING VOLTAGE OF POWER SUPPLY OF DATA PROCESSING DEVICE, DATA PROCESSING DEVICE, AND STORAGE MEDIUM

CROSS REFERENCE TO RELATED APPLICATIONS

The present application is a U.S. national stage entry of International Application No. PCT/CN2021/094527, filed May 19, 2021, entitled "POWER SUPPLY VOLTAGE CONTROL METHOD AND APPARATUS FOR DATA PROCESSING DEVICE, DATA PROCESSING DEVICE, AND STORAGE MEDIUM", which claims priority to Chinese Patent Application No. 202010830757.9, filed Aug. 18, 2020, entitled "METHOD AND APPARATUS FOR CONTROLLING VOLTAGE OF POWER SUPPLY OF DIGITAL CURRENCY MINING MACHINE AND DIGITAL CURRENCY MINING MACHINE", both of which are hereby incorporated by reference in their entireties.

TECHNICAL FIELD

This application relates to the field of digital currency technologies, and in particular, to a method and an apparatus for controlling a voltage of a power supply of a data processing device, a data processing device, and a storage medium.

BACKGROUND

Digital currency can be considered as a type of virtual currency based on a node network and a digital encryption algorithm. The core characteristics of the digital currency mainly include: 1. the digital currency has no issuer since it comes from certain open algorithms: 2. the total amount of the digital currency is fixed since the number of algorithm solutions is determined:and 3. the transaction process of the digital currency is sufficiently secure since the transaction process requires the approval of each node in the network. With the rapid development of supercomputers, the digital currency mining machine has gradually developed from a graphics card mining machine to an Application-Specific Integrated Circuit (ASIC) mining machine with lower power consumption and lower costs. At present, the digital currency mining machine generally runs the firmware customized by the manufacturer to complete functions such as connecting to the mining pool, running the mining program, and providing the mining farm operation and maintenance interface.

During the operation of the digital currency mining machine, the change of ambient temperature may lead to the change of the overall temperature of the mining machine.

SUMMARY

Embodiments of this application provide a method and apparatus for controlling a voltage of a power supply of a data processing device, a data processing device, and a storage medium.

The technical solutions of the embodiments of this application are as follows:

A method for controlling a voltage of a power supply of a data processing device, comprising:

determining a computing power ratio of the data processing device based on an actual computing power and a theoretical computing power of the data processing device:

generating a power supply control instruction based on a result of comparison between the computing power ratio and a predetermined threshold; and controlling an output voltage of the power supply of the data processing device based on the power supply control instruction.

An apparatus for controlling a voltage of a power supply of a data processing device, comprising:

a computing power ratio determining module, configured to determine a computing power ratio of the data processing device based on an actual computing power and a theoretical computing power of the data processing device:

an instruction generation module, configured to generate a power supply control instruction based on a result of comparison between the computing power ratio and a predetermined threshold; and a control module, configured to control an output voltage of the power supply of the data processing device based on the power supply control instruction.

An apparatus for controlling a voltage of a power supply of a data processing device, comprising:

a memory; and a processor, wherein the memory stores an application executable by the processor, to cause the processor to perform the method for controlling a voltage of a power supply of a data processing device according to any one above.

A data processing device, comprising:

a hashboard; and a control board, comprising: a memory and a processor, wherein the memory stores an application executable by the processor, to cause the processor to perform the method for controlling a voltage of a power supply of a data processing device according to any one above:

wherein the hashboard has a signal connection with the control board through a signal connection interface, and the hashboard has an electrical connection with the power supply through a power supply connection interface.

A non-volatile computer-readable storage medium storing a computer-readable instruction thereon, wherein the computer-readable instruction is used to perform the method for controlling a voltage of a power supply of a data processing device according to any one above.

As can be seen from the foregoing technical solutions, in the implementations of this application, a computing power ratio of the data processing device is determined based on an actual computing power and a theoretical computing power of the data processing device: a power supply control instruction is generated based on a result of comparison between the computing power ratio and a predetermined threshold; and an output voltage of the power supply of the data processing device is controlled based on the power supply control instruction. Therefore, it can be seen that, according to the implementations of this application, an automatic voltage regulation for the output voltage of the power supply is achieved, and a good compromise can be obtained between the power consumption loss and the computing power of the data processing device.

DETAILED DESCRIPTION

To make objectives, technical solutions and advantages of this application clearer, this application is described in further detail with reference to the accompanying drawings in the following.

For concise and intuitive descriptions, solutions of this application are stated below by using several representative implementations. A large quantity of details in the implementations is merely used for helping understand the solutions of this application. However, obviously, implementation of the technical solutions of this application may not be limited to these details. To avoid unnecessarily blurring the solutions of this application, some implementations are not described in detail, but only frames are provided. In the following, "comprise" refers to "comprise, but is not limited to", and "according to" refers to "at least according to, but not limited to only according to". Because of Chinese language habits, the following does not particularly specify the number of a component, which means that the component may be one or more, or can be understood as at least one.

The applicant finds that: In the related art, during normal operation of a data processing device, there is no automatic voltage regulation mechanism for an output voltage of a power supply of the data processing device, that is, the output voltage of the power supply of the data processing device is usually maintained at a preset fixed voltage value. The related art has the following drawbacks: when a temperature of the data processing device is too high, maintaining the output voltage wastes power consumption; and when the temperature of the data processing device is too low, maintaining the output voltage affects a computing power and stability of the data processing device.

In a research process of trying to solve this technical problem, the applicant further finds that: generally, the overall temperature of the data processing device rises as an ambient temperature rises, and in this case the output voltage of the power supply can be appropriately reduced to reduce power consumption. Otherwise, the overall temperature of the data processing device decreases when an ambient temperature decreases, and in this case the output voltage of the power supply needs to be appropriately increased to ensure the computing power and stability of the data processing device.

In an embodiment of this application, the data processing device may be a digital currency processing device, a supercomputing server, a digital currency mining machine, and the like.

Figure 1:
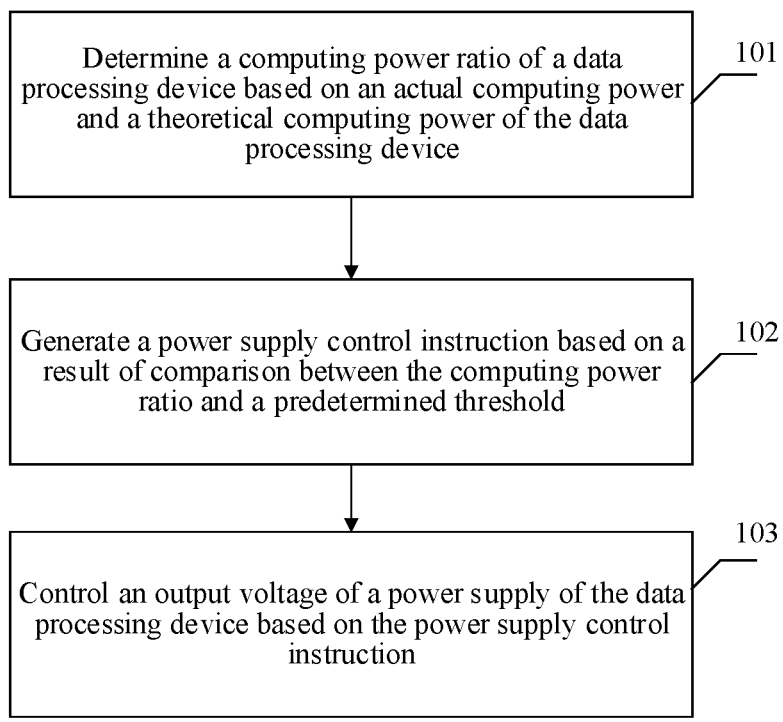
FIG. 1 is an exemplary flowchart of a method for controlling a voltage of a power supply of a data processing device according to some embodiments of this application.

Based on the foregoing analysis, FIG. 1 is an exemplary flowchart of a method for controlling a voltage of a power supply of a data processing device according to this application.

As shown in FIG. 1, the method includes:

Step 101: Determine a computing power ratio of the data processing device based on an actual computing power and a theoretical computing power of the data processing device.

The applicant proposes a concept of the computing power ratio and a calculation method of the computing power ratio.

The computing power ratio is a ratio of an actual computing power of the data processing device to a theoretical computing power of the data processing device. That is, Computing power ratio=(actual computing power)/(theoretical computing power)

The theoretical computing power is a computing power calculated according to a theory with reference to parameters of the data processing device. Specifically, the theoretical computing power can be determined according to a number of chips, a number of cores in each chip, a chip frequency, and the like.

The actual computing power is a computing power of the data processing device actually presented in a predetermined time. Specifically, the actual computing power can be determined by the actual computing power of each chip and a number of the chips, where the actual computing power of each chip can be determined based on a total number of random numbers (a total number of Nonce) of the chip within a predetermined time, a random number difficulty (a Nonce difficulty) of the chip, and the predetermined time. Nonce is an abbreviation of Number used once or Number once, meaning an arbitrary or non-repetitive random number that is used only once, specifically the random number that meets the Nonce difficulty. Each Nonce is a traversal result of the chips of the data processing device.

In some implementations, the determining a computing power ratio of the data processing device based on an actual computing power and a theoretical computing power of the data processing device in step 101 specifically includes:

Sub-step (1). Determine the theoretical computing power of each chip based on the number of cores and the chip frequency of the chip; and determine a sum value of theoretical computing powers of chips as the theoretical computing power of the data processing device.

For example, the theoretical computing power of each chip is equal to a product of the number of cores and the chip frequency of the chip. A sum result of the theoretical computing powers of all the chips in the data processing device is the theoretical computing power of the data processing device.

Sub-step (2). Determine the actual computing power of each chip based on the total number of Nonce of the chip within the predetermined time, the Nonce difficulty of the chip, and the predetermined time; and determine a sum value of the actual computing powers of the chips as the actual computing power of the data processing device.

For example, the actual computing power K of each chip has the following expression: $K = M*Q/T$ where M is the total Nonce number of the chip in the predetermined time T; Q is the Nonce difficulty of the chip; and T is a length of the predetermined time. Moreover, the sum result of the actual computing powers of all the chips in the data processing device is the actual computing power of the data processing device.

Sub-step (3). Determine a ratio of the actual computing power of the data processing device determined in sub-step (2) to the theoretical computing power of the data processing device determined in sub-step (1) as the computing power ratio of the data processing device.

The above exemplarily describes an implementation of determining the computing power ratio of the data processing device based on the actual computing power and the theoretical computing power of the data processing device. A person skilled in the art can be aware that this description is only exemplary and is not intended to limit the protection scope of the implementation of this application.

Step 102: Generate a power supply control instruction based on a result of comparison between the computing power ratio and a predetermined threshold.

The predetermined threshold has any one of the following cases:

Case (1): There is one predetermined threshold, which is a first threshold (an upper limit value of the computing power ratio).

Case (2): There is one predetermined threshold, which is a second threshold (a lower limit value of the computing power ratio).

Case (3): There are two predetermined thresholds, which are the first threshold (the upper limit value of the computing power ratio) and the second threshold (the lower limit value of the computing power ratio) respectively.

Wherein the first threshold is greater than the second threshold. Moreover, the power supply control instruction may specifically include: a voltage reduction instruction, a voltage increase instruction, or a voltage maintenance instruction.

Example (1)

When there is one predetermined threshold which is the first threshold, if the computing power ratio is greater than or equal to the first threshold, it is determined that the actual computing power of the data processing device is high (for example, a high ambient temperature causes a high temperature of the data processing device). In this case, the output voltage of the power supply of the data processing device can be reduced to reduce the power consumption of the data processing device. Therefore, the voltage reduction instruction is generated in step 102.

Example (2)

When there is one predetermined threshold which is the second threshold, if the computing power ratio is less than or equal to the second threshold, it is determined that the actual computing power of the data processing device is low (for example, a low ambient temperature causes a low temperature of the data processing device). In this case, the output voltage of the power supply of the data processing device can be increased to ensure the computing power and the stability of the data processing device. Therefore, the voltage increase instruction is generated in step 102.

Example (3)

When there are two predetermined thresholds which are the first threshold and the second threshold, if the computing power ratio is greater than or equal to the first threshold, it is determined that the actual computing power of the data processing device is high. In this case, the output voltage of the power supply of the data processing device can be reduced to reduce the power consumption of the data processing device. Therefore, the voltage reduction instruction is generated in step 102. If the computing power ratio is less than or equal to the second threshold, it is determined that the actual computing power of the data processing device is low. In this case, the output voltage of the power supply of the data processing device can be increased to ensure the computing power and the stability of the data processing device. Therefore, the voltage increase instruction is generated in step 102. If the computing power ratio is between the first threshold and the second threshold, it is determined that the actual computing power of the data processing device is relatively ideal (for example, the ambient temperature is appropriate and the temperature of the data processing device is appropriate). In this case, it is determined that the output voltage of the power supply of the data processing device needs to be maintained. Therefore, the voltage maintenance instruction is generated in step 102.

Step 103: Control the output voltage of the power supply of the data processing device based on the power supply control instruction.

The output voltage of the power supply of the data processing device is controlled based on the power supply control instruction generated in step 102. The output voltage of the power supply of the data processing device is a voltage outputted to the chip from the power supply of the data processing device.

In some implementations, the output voltage of the power supply of the data processing device is reduced based on the voltage reduction instruction. In some embodiments, the output voltage of the power supply of the data processing device is progressively reduced in a fixed step (for example, 10 millivolts).

For example, it is assumed that an original output voltage of the power supply of the data processing device is 12 volts (V). After the voltage reduction instruction is generated in step 102, the voltage reduction instruction is executed in step 103 to reduce the output voltage by 10 millivolts. Then, return to step 101 to calculate the computing power ratio in the predetermined time again, and after the voltage reduction instruction is generated again based on a result of comparison between the computing power ratio calculated again and the first threshold, execute the voltage reduction instruction to reduce the output voltage by 10 millivolts (mv) again. Repeat the process until no voltage reduction instruction is generated based on the result of comparison between the computing power ratio and the first threshold.

In some implementations, the output voltage of the power supply of the data processing device is increased based on the voltage increase instruction. In some embodiments, the output voltage of the power supply of the data processing device is progressively increased in a fixed step (for example, 10 millivolts).

For example, it is assumed that the original output voltage of the power supply of the data processing device is 12 volts (V). After the voltage increase instruction is generated in step 102, the voltage increase instruction is executed in step 103 to increase the output voltage by 10 millivolts. Then, return to step 101 to calculate the computing power ratio in the predetermined time again, and after the voltage increase instruction is generated again based on a result of comparison between the computing power ratio calculated again and the second threshold, execute the voltage increase instruction to increase the output voltage by 10 millivolts (mv) again. Repeat the process until no voltage increase instruction is generated based on the result of comparison between the computing power ratio and the second threshold.

In some implementations, the output voltage of the power supply of the data processing device is maintained based on the voltage maintenance instruction.

For example, after the voltage maintenance instruction is generated in step 102, the voltage maintenance instruction is executed in step 103 to maintain the output voltage. Then, return to step 101 to calculate the computing power ratio in the predetermined time again and determine whether the power supply control instruction is specifically the voltage increase instruction, the voltage reduction instruction, or the voltage maintenance instruction based on the result of comparison of the computing power ratio calculated again.

It is can be seen that in an implementation of this application, the output voltage of the power supply of the data processing device can be adjusted in real time by monitoring the computing power ratio of the data processing device in the predetermined time in real time to avoid wasting excessive power consumption.

Moreover, this application further provides a calculation method of the computing power ratio, to accurately control the output voltage of the power supply using the calculated computing power ratio.

In addition, when the computing power ratio is greater than or equal to the first threshold due to factors such as the excessively high temperature of the data processing device, the output voltage is reduced in the implementations of this application, thereby avoiding waste of power consumption of the data processing device. When the computing power ratio is less than or equal to the second threshold due to factors such as the excessively low temperature of the data processing device, the output voltage is increased in the implementations of this application, thereby ensuring the computing power and stability of the data processing device. In addition, when the computing power ratio is between the first threshold and the second threshold, the output voltage is maintained in the implementations of this application, to ensure that the good compromise state can continue.

An example in which a data processing device is a digital currency mining machine is taken below to describe the specific implementation of the above case (1). There is one predetermined threshold, which is a first threshold (an upper limit value of the computing power ratio).

Figure 2:
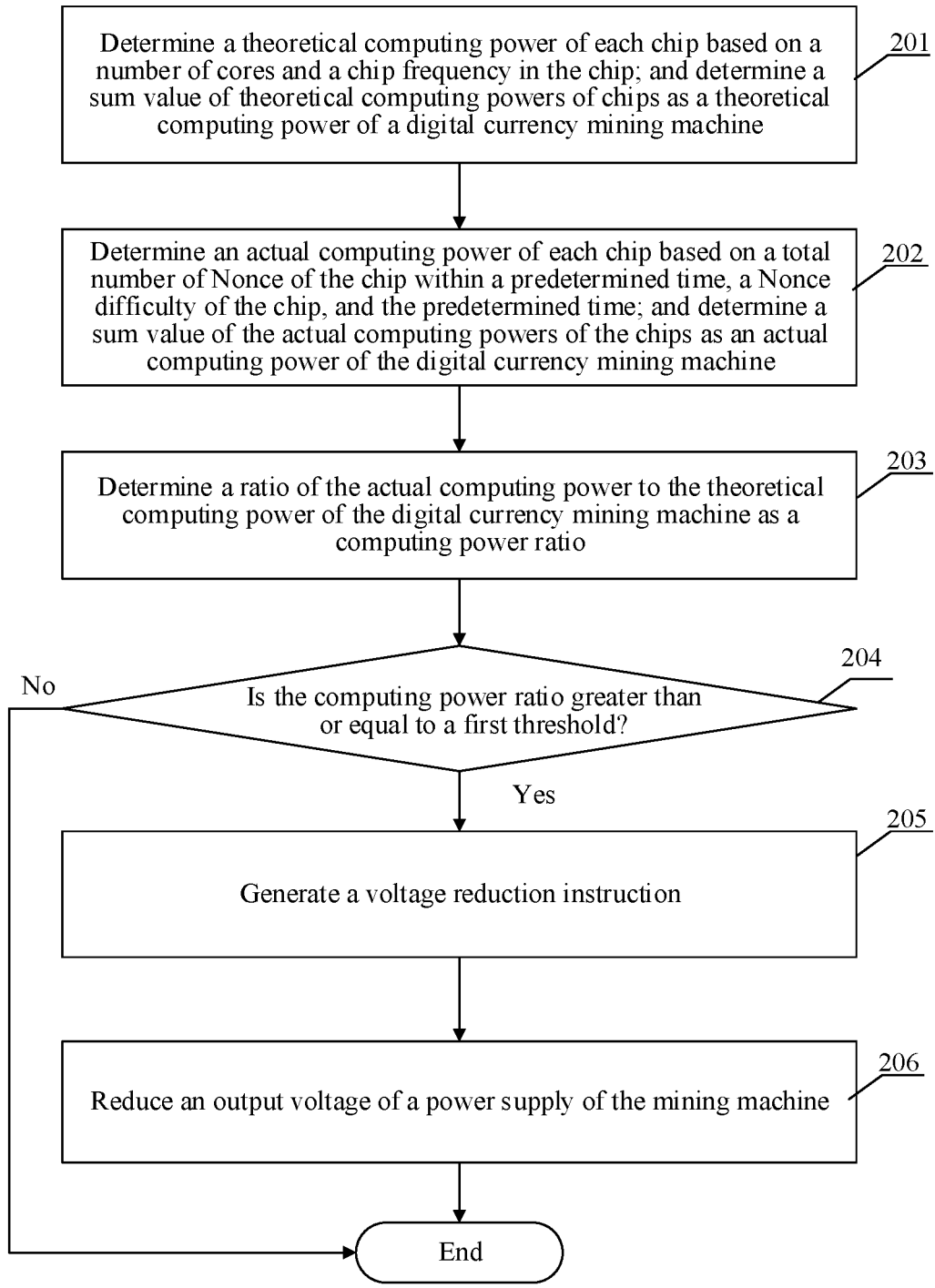
FIG. 2 is a first exemplary flowchart of a method for controlling a voltage of a power supply of a digital currency mining machine according to some embodiments of this application.

FIG. 2 is a first exemplary flowchart of a method for controlling a voltage of a power supply of a digital currency mining machine according to this application.

As shown in FIG. 2, the method includes:

Step 201: Determine a theoretical computing power of each chip based on a number of cores and a chip frequency of the chip; and determine a sum value of theoretical computing powers of chips as a theoretical computing power of the digital currency mining machine.

Step 202: Determine an actual computing power of each chip based on a total number of Nonce of the chip within a predetermined time, a Nonce difficulty of the chip, and the predetermined time; and determine a sum value of the actual computing powers of the chips as an actual computing power of the digital currency mining machine.

Step 203: Determine a ratio of the actual computing power determined in step 202 to the theoretical computing power determined in step 201 as a computing power ratio.

Step 204: Determine whether the computing power ratio is greater than the predetermined first threshold (for example, 99.8%). If yes, perform step 205 and exit this process, otherwise, exit this process.

Step 205: Generate a voltage reduction instruction.

Step 206: Execute the voltage reduction instruction to reduce the output voltage of the power supply of the mining machine and exit this process.

In some embodiments, after performing step 206 and exiting this process, start timing (for example, set a 15-minute timer). When time is up, re-perform the method flow shown in FIG. 2 from step 201. Therefore, the output voltage of the power supply of the mining machine can be continuously controlled by cyclically performing the method flow shown in FIG. 2.

An example in which a data processing device is a digital currency mining machine is taken below to describe the specific implementation of the above case (2). There is one predetermined threshold, which is a second threshold (a lower limit value of the computing power ratio).

Figure 3:
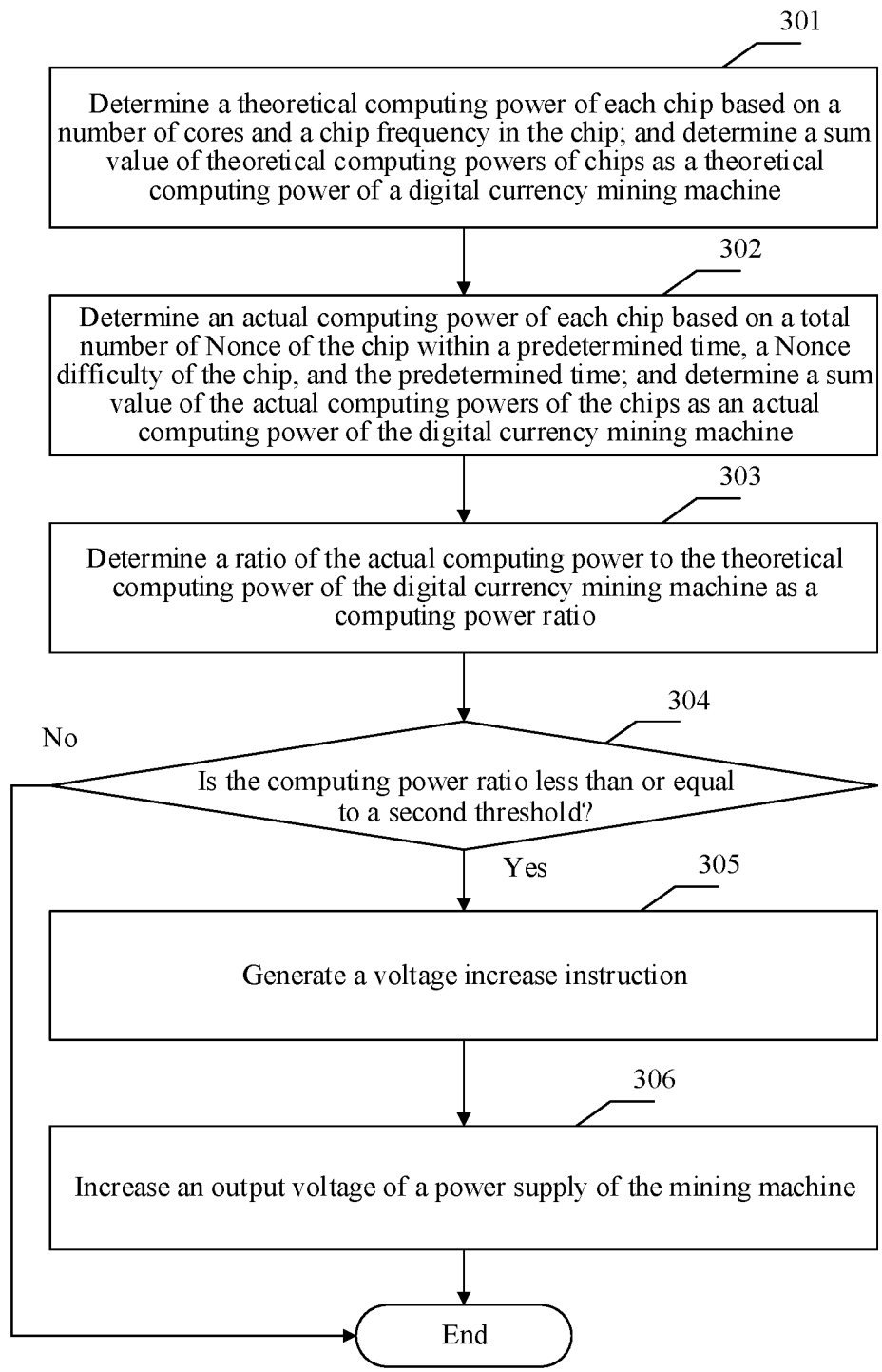
FIG. 3 is a second exemplary flowchart of a method for controlling a voltage of a power supply of a digital currency mining machine according to some embodiments of this application.

FIG. 3 is a second exemplary flowchart of a method for controlling a voltage of a power supply of a digital currency mining machine according to this application.

As shown in FIG. 3, the method includes:

Step 301: Determine a theoretical computing power of each chip based on a number of cores and a chip frequency of the chip; and determine a sum value of theoretical computing powers of chips as a theoretical computing power of the digital currency mining machine.

Step 302: Determine an actual computing power of each chip based on a total number of Nonce of the chip within a predetermined time, a Nonce difficulty of the chip, and the predetermined time; and determine a sum value of the actual computing powers of the chips as an actual computing power of the digital currency mining machine.

Step 303: Determine a ratio of the actual computing power determined in step 302 to the theoretical computing power determined in step 301 as a computing power ratio.

Step 304: Determine whether the computing power ratio is less than the predetermined second threshold (for example, 98.0%). If yes, perform step 305 and exit this process, otherwise, exit this process.

Step 305: Generate a voltage increase instruction.

Step 306: Execute the voltage increase instruction to increase the output voltage of the power supply of the mining machine and exit this process.

In some embodiments, after performing step 306 and exiting this process, start timing (for example, set a 15-minute timer). When time is up, re-perform the method flow shown in FIG. 3 from step 301. Therefore, the output voltage of the power supply of the mining machine can be continuously controlled by cyclically performing the method flow shown in FIG. 3.

An example in which a data processing device is a digital currency mining machine is taken below to describe the specific implementation of the above case (3). There are two predetermined thresholds, which are a first threshold (an upper limit value of the computing power ratio) and a second threshold (a lower limit value of the computing power ratio) respectively.

Figure 4:
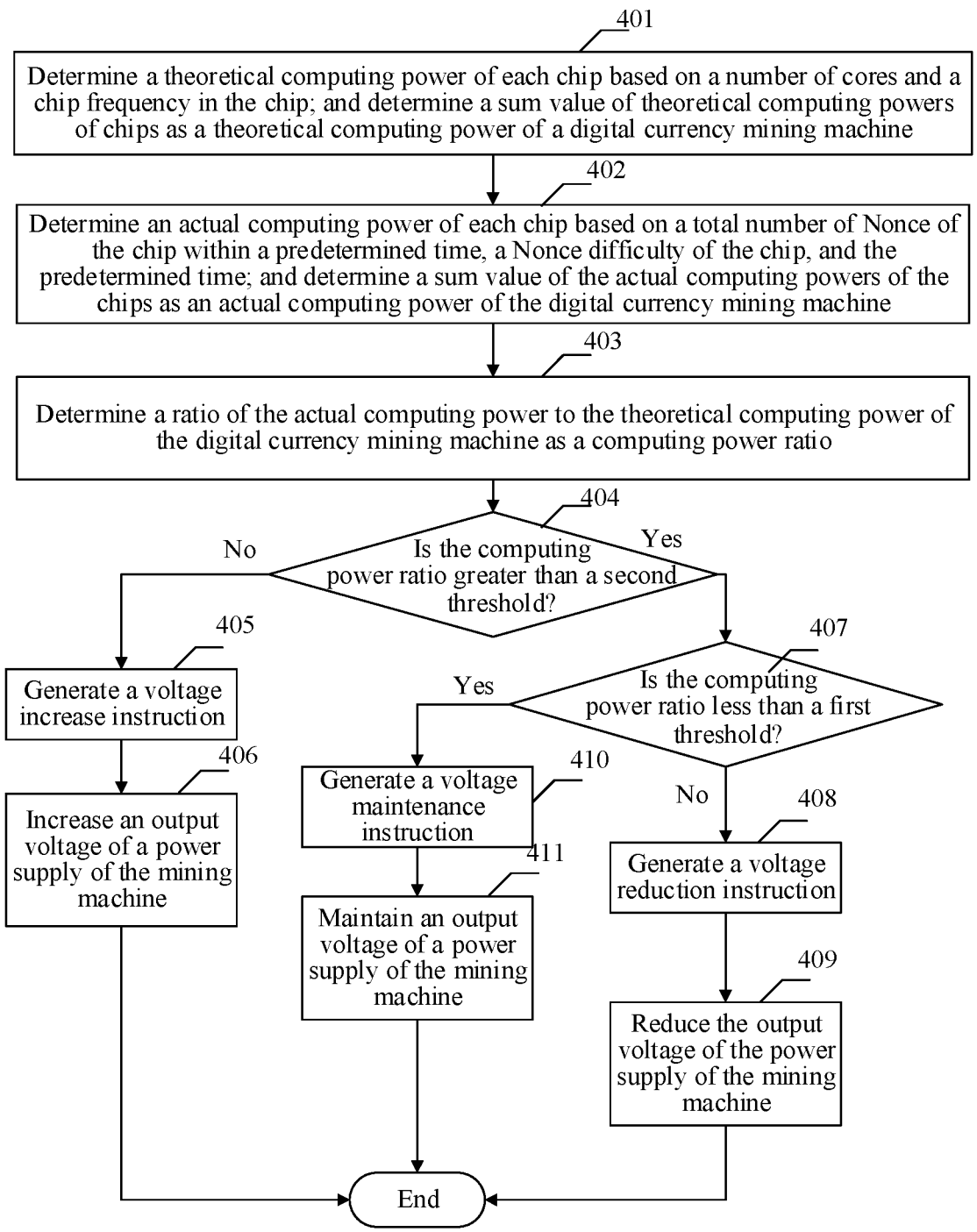
FIG. 4 is a third exemplary flowchart of a method for controlling a voltage of a power supply of a digital currency mining machine according to some embodiments of this application.

FIG. 4 is a third exemplary flowchart of a method for controlling a voltage of a power supply of a digital currency mining machine according to this application.

As shown in FIG. 4, the method includes:

Step 401: Determine a theoretical computing power of each chip based on a number of cores and a chip frequency of the chip; and determine a sum value of theoretical computing powers of chips as a theoretical computing power of the digital currency mining machine.

Step 402: Determine an actual computing power of each chip based on a total number of Nonce of the chip within a predetermined time, a Nonce difficulty of the chip, and the predetermined time; and determine a sum value of the actual computing powers of the chips as an actual computing power of the digital currency mining machine.

Step 403: Determine a ratio of the actual computing power determined in step 402 to the theoretical computing power determined in step 401 as a computing power ratio.

Step 404: Determine whether the computing power ratio is greater than the predetermined second threshold (for example, 98.0%). If yes, perform step 407 and subsequent steps, otherwise, perform step 405 and subsequent steps.

Step 405: Generate a voltage increase instruction.

Step 406: Execute the voltage increase instruction to increase the output voltage of the power supply of the mining machine and exit this process.

Step 407: Determine whether the computing power ratio is less than the predetermined first threshold (for example, 99.8%). If yes, perform step 410 and subsequent steps, otherwise, perform step 408 and subsequent steps.

Step 408: Generate a voltage reduction instruction.

Step 409: Execute the voltage reduction instruction to reduce the output voltage of the power supply of the mining machine and exit this process.

Step 410: Generate a voltage maintenance instruction.

Step 411: Execute the voltage maintenance instruction to maintain the output voltage of the power supply of the mining machine and exit this process.

In some embodiments, after performing step 406, step 411 or step 409 to exiting this process, start timing (for example, set a 15-minute timer). When time is up, re-perform the method flow shown in FIG. 4 from step 401. Therefore, the output voltage of the power supply of the mining machine can be continuously controlled by cyclically performing the method flow shown in FIG. 4.

Based on the foregoing description, an implementation of this application further provides an apparatus for controlling a voltage of a power supply of a data processing device.

Figure 5:
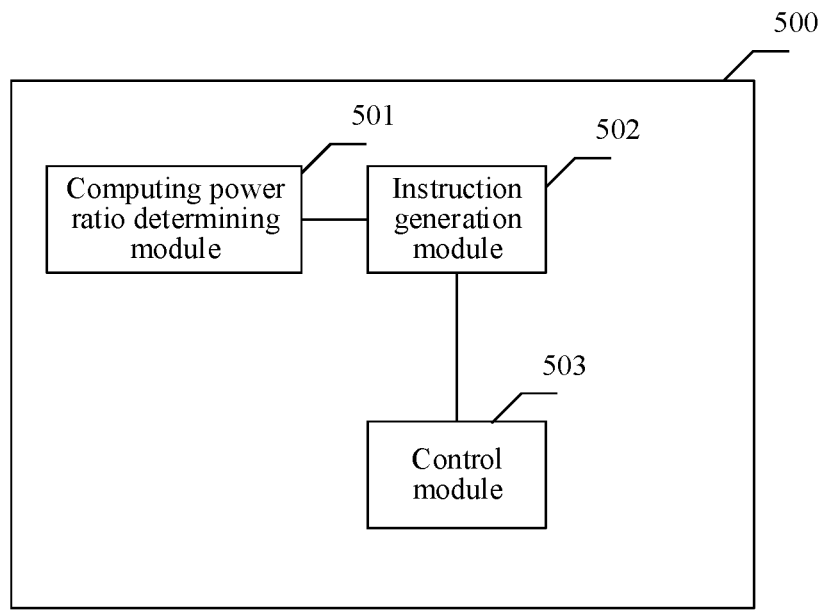
FIG. 5 is an exemplary structural diagram of an apparatus for controlling a voltage of a power supply of a data processing device according to some embodiments of this application.

FIG. 5 is an exemplary structural diagram of the apparatus for controlling a voltage of a power supply of a data processing device according to this application.

As shown in FIG. 5, the apparatus 500 includes:

a computing power ratio determining module 501, configured to determine a computing power ratio of the data processing device based on an actual computing power and a theoretical computing power of the data processing device:

an instruction generation module 502, configured to generate a power supply control instruction based on a result of comparison between the computing power ratio and a predetermined threshold; and a control module 503, configured to control an output voltage of the power supply of the data processing device based on the power supply control instruction.

In some implementations, the computing power ratio determining module 501 is further configured to determine a theoretical computing power of each chip based on a number of cores and a chip frequency of the chip; determine a sum value of theoretical computing powers of chips as a theoretical computing power of the digital currency data processing device; determine an actual computing power of each chip based on a total number of Nonce of the chip within the predetermined time, a Nonce difficulty of the chip, and the predetermined time; determine a sum value of the actual computing powers of the chips as the actual computing power of the data processing device; and determine a ratio of the actual computing power to the theoretical computing power as the computing power ratio.

In some implementations, the predetermined threshold includes a first threshold and/or a second threshold, and the first threshold is greater than the second threshold.

In some implementations, the instruction generation module 502 is further configured to generate a voltage reduction instruction in a case that the computing power ratio is greater than or equal to the first threshold; and the control module 503 is further configured to reduce the output voltage of the power supply of the data processing device based on the voltage reduction instruction.

In some implementations, the instruction generation module 502 is further configured to generate a voltage increase instruction in a case that the computing power ratio is less than or equal to the second threshold; and the control module 503 is configured to increase the output voltage of the power supply of the data processing device based on the voltage increase instruction.

In some implementations, the instruction generation module 502 is further configured to generate a voltage maintenance instruction in a case that the computing power ratio is less than the first threshold and greater than the second threshold; and the control module 503 is further configured to maintain the output voltage of the power supply of the data processing device based on the voltage maintenance instruction.

An implementation of this application further provides an apparatus for controlling a voltage of a power supply of a data processing device with a memory-processor architecture.

Figure 6:
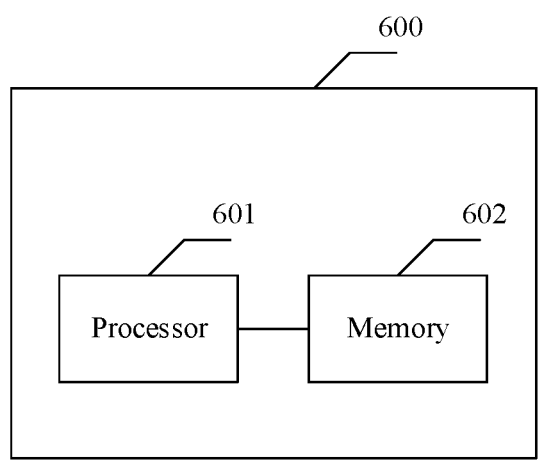
FIG. 6 is an exemplary structural diagram of an apparatus for controlling a voltage of a power supply of a data processing device with a memory-processor architecture according to some embodiments of this application.

FIG. 6 is an exemplary structural diagram of the apparatus for controlling a voltage of a power supply of a data processing device with the memory-processor architecture according to this application.

As shown in FIG. 6, the apparatus 600 for controlling a voltage of a power supply includes: a processor 601: and a memory 602, wherein the memory 602 stores an application executable by the processor 601, to cause the processor 601 to perform any method for controlling a voltage of a power supply of a data processing device described above.

The memory 602 can be specifically implemented as multiple storage media such as an electrically erasable programmable read-only memory (EEPROM), a Flash memory, a programmable read-only memory (PROM), and the like. The processor 601 can be implemented to include one or more central processing units or one or more field-programmable gate arrays, where the field-programmable gate array integrates one or more central processing unit cores. Specifically, the central processing unit or the central processing unit core can be implemented as a CPU, an MCU, or a digital signal processor (DSP).

Figure 7:
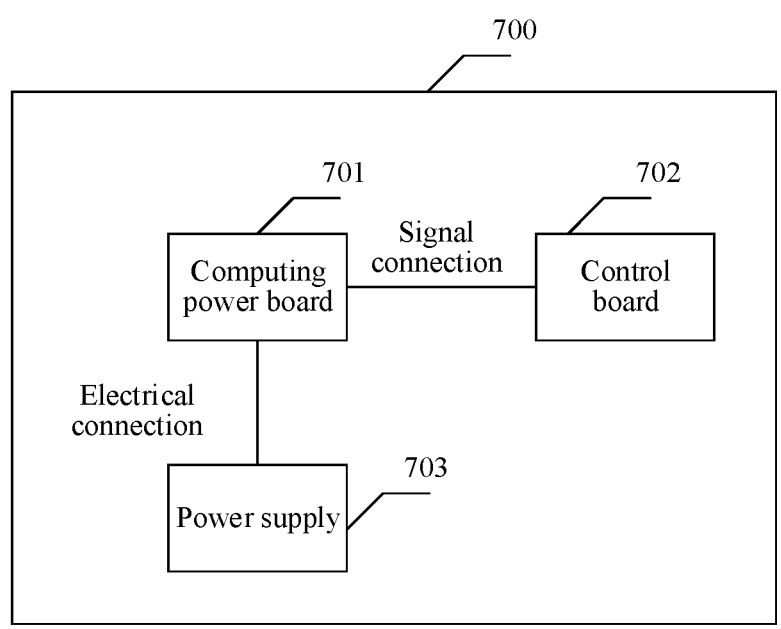
FIG. 7 is an exemplary structural diagram of a data processing device according to some embodiments of this application.

An implementation of this application further provides a data processing device. FIG. 7 is an exemplary structural diagram of the data processing device according to an embodiment of this application.

As shown in FIG. 7, the data processing device includes:

a hashboard 701, configured to run a mining program; and a control board 702, including a memory and a processor: wherein the memory stores an application executable by the processor, to cause the processor to perform any method for controlling a voltage of a power supply of a data processing device described above: wherein the hashboard 701 has a signal connection with the control board 702 through a signal connection interface, and the hashboard 701 has an electrical connection with the power supply 703 through a power supply connection interface.

To sum up, in the implementations of this application, a computing power ratio of the data processing device is determined based on an actual computing power and a theoretical computing power of the data processing device: a power supply control instruction is generated based on a result of comparison between the computing power ratio and a predetermined threshold; and the output voltage of the power supply of the data processing device is controlled based on the power supply control instruction. Therefore, it can be seen that, according to the implementations of this application, an automatic voltage regulation for the output voltage of the power supply is achieved, and a good compromise can be obtained between the power consumption loss and the computing power of the data processing device. Moreover, this application further provides a calculation method of the computing power ratio, to accurately control the output voltage of the power supply using the computing power ratio. In addition, when the computing power ratio is greater than or equal to the first threshold due to factors such as the excessively high temperature of the data processing device, the output voltage is reduced in the implementations of this application, thereby avoiding waste of power consumption of the data processing device. When the computing power ratio is less than or equal to the first threshold due to factors such as the excessively low temperature of the data processing device, the output voltage is increased in the implementations of this application, thereby ensuring the computing power and stability of the data processing device. In addition, when the computing power ratio is between the first threshold and the second threshold, the output voltage is maintained in the implementations of this application, to ensure that the good compromise can continue.

It is to be understood that, not all steps and modules in the procedures and the structural diagrams are necessary, and some steps or modules may be omitted according to actual needs. An execution sequence of the steps is not fixed and may be adjusted according to needs. Division of the modules is merely functional division for ease of description. During actual implementation, one module may be implemented separately by a plurality of modules, and functions of the plurality of modules may alternatively be implemented by the same module. The modules may be located in the same device or in different devices.

Hardware modules in the implementations may be implemented in a mechanic manner or an electronic manner. For example, a hardware module may comprise specially designed permanent circuits or logic devices (for example, an application-specific processor such as an FPGA or an ASIC) to complete specific operations. The hardware module may also comprise temporarily configured programmable logic devices or circuits (for example, comprising a universal processor or other programmable processors) to perform specific operations. Whether the hardware module is specifically implemented by using the mechanical manner, using the application-specific permanent circuits, or using the temporarily configured circuits (for example, configured by software) can be decided according to consideration of costs and time.

This application further provides a machine-readable storage medium, which stores an instruction that is used to cause a machine to perform the method described in this application. Specifically, a system or an apparatus that is equipped with a storage medium may be provided. The storage medium stores software program code that implements functions of any embodiment in the foregoing implementations, and a computer (a CPU or an MPU) of the system or the apparatus is enabled to read and execute the program code stored in the storage medium. In addition, program code-based instructions may also be used to enable an operating system or the like running in the computer to complete some or all actual operations. The program code read from the storage medium may also be written into a memory that is disposed in an expansion board inserted in the computer, or may be written into a memory that is disposed in an expansion unit connected to the computer, and then a CPU or the like that is installed on the expansion board or expansion unit may be enabled to execute some or all actual operations based on the instructions of the program code, so as to implement the functions of any implementation in the foregoing implementations. Implementations of the storage medium for providing the program code may comprise a floppy disk, a hard disk, a magneto-optical disk, an optical disk (such as a CD-ROM, a CD-R, a CD-RW, a DVD-ROM, a DVD-RAM, a DVD-RW, and a DVD+RW), a magnetic tape, a non-volatile storage card, and a ROM. In some embodiments, the program code may be downloaded from a server computer or a cloud through a communication network.

In this specification, "schematic" indicates "serving as an example, a case, or description", and any illustration or implementation described as "schematic" in this specification should not be interpreted as a technical solution. For brevity of the accompanying drawings, only parts related to this application are schematically shown in the accompanying drawings, and do not represent an actual structure as a product. In addition, for brevity of the accompanying drawings and ease of understanding, for components with same structures or functions in some accompanying drawings, only one of the components is schematically shown or marked. In this specification, "one" does not mean that the number of relevant parts of this application is limited to "only one", and "one" does not mean the case that the number of relevant parts of this application "more than one" is excluded. In this specification, "up", "down", "front", "back", "left", "right", "inside" and "outside" are only used to indicate the relative positional relationship between the relevant parts, rather than limiting the absolute positions of these relevant parts.

The foregoing descriptions are merely preferred embodiments of this application, are not intended to limit the protection scope of this application. Any modification, equivalent replacement, or improvement made without departing from the spirit and principle of this application shall fall within the protection scope of this application.

What is claimed is:

1. A method for controlling a voltage of a power supply of a data processing device, comprising:
    determining a computing power ratio of the data processing device based on an actual computing power and a theoretical computing power of the data processing device;
    generating a power supply control instruction based on a result of comparison between the computing power ratio and a predetermined threshold; and
    controlling an output voltage of the power supply of the data processing device based on the power supply control instruction,
    wherein said determining a computing power ratio of the data processing device based on an actual computing power and a theoretical computing power of the data processing device comprises:
    determining a theoretical computing power of each chip of the data processing device based on a number of cores and a chip frequency of the chip; determining a sum value of theoretical computing powers of chips as the theoretical computing power of the data processing device;

determining an actual computing power of each chip based on a total number of Nonce of the chip within a predetermined time, a Nonce difficulty of the chip, and the predetermined time;

determining a sum value of the actual computing powers of the chips as the actual computing power of the data processing device; and determining a ratio of the actual computing power to the theoretical computing power as the computing power ratio.

2. The method according to claim 1, wherein the predetermined threshold comprises a first threshold and/or a second threshold, and the first threshold is greater than the second threshold.

3. The method according to claim 2, wherein said generating the power supply control instruction based on a result of comparison between the computing power ratio and the predetermined threshold comprises: generating a voltage reduction instruction in a case that the computing power ratio is greater than or equal to the first threshold; and said controlling the output voltage of the power supply of the data processing device based on the power supply control instruction comprises: reducing the output voltage of the power supply of the data processing device based on the voltage reduction instruction.

4. The method according to claim 2, wherein said generating the power supply control instruction based on a result of comparison between the computing power ratio and the predetermined threshold comprises: generating a voltage increase instruction in a case that the computing power ratio is less than or equal to the second threshold; and said controlling the output voltage of the power supply of the data processing device based on the power supply control instruction comprises: increasing the output voltage of the power supply of the data processing device based on the voltage increase instruction.

5. The method according to claim 2, wherein said generating a power supply control instruction based on a result of comparison between the computing power ratio and the predetermined threshold comprises: generating a voltage maintenance instruction in a case that the computing power ratio is less than the first threshold and greater than the second threshold; and said controlling the output voltage of the power supply of the data processing device based on the power supply control instruction comprises: maintaining the output voltage of the power supply of the data processing device based on the voltage maintenance instruction.

6. An apparatus for controlling a voltage of a power supply of a data processing device, comprising:

a memory; and a processor, wherein the memory stores an application executable by the processor, to cause the processor to perform the method for controlling a voltage of a power supply of a data processing device according to claim 1.

7. A data processing device, comprising:

a hashboard; and a control board, comprising: a memory and a processor, wherein the memory stores an application executable by the processor, to cause the processor to perform the method for controlling a voltage of a power supply of a data processing device according to claim 1;

wherein the hashboard has a signal connection with the control board through a signal connection interface, and the hashboard has an electrical connection with the power supply through a power supply connection interface.

* * * * *